United States Patent [19]

Basehore

[11] Patent Number: 4,731,828

[45] Date of Patent: Mar. 15, 1988

[54] RING TRIP DETECTION IN TELECOMMUNICATIONS EXCHANGES

[75] Inventor: Paul M. Basehore, Sanford, Fla.

[73] Assignee: Plessey Overseas Limited, Ilford, England

[21] Appl. No.: 742,352

[22] Filed: Jun. 7, 1985

[51] Int. Cl.$^4$ .............................................. H04M 3/06
[52] U.S. Cl. ................................................. 379/382
[58] Field of Search .............. 179/81 R, 84 R, 84 A, 179/18 HB, 18 FA; 379/382, 373, 374, 375, 376, 257

[56] References Cited

U.S. PATENT DOCUMENTS 4,524,245  6/1985  Littlefield ............................ 379/373
4,540,853  9/1985  Albouy ................................. 379/378

*Primary Examiner*—James L. Dwyer
*Attorney, Agent, or Firm*—Michael F. Oglo; Julian C. Renfro

[57] ABSTRACT

To facilitate ring trip detection in a telecommunications exchange the ringing signal applied to a customer line is limited to provide a square wave output. Since when the customers instrument is "on hook" virtually no direct current flows in the line, the square wave output has substantial 50—50 duty cycle and when the customer instrument goes "off hook" the d.c. alters that duty cycle, by sampling the square wave signal and counting up for, say, positive samples and down for, say, negative samples, any significant change in the duty cycle causes a counter to exceed a ring-trip threshold fairly rapidly. An algorithm and circuit using the algorithm to facilitate identification of "ring trip" based on the above feature are disclosed herein.

3 Claims, 7 Drawing Figures

RING TRIP DETECTION IN TELECOMMUNICATIONS EXCHANGES

BACKGROUND OF THE INVENTION

The present invention relates to telecommunications exchanges and in particular to ring trip detection ciruitry for such exchanges.

To alert telephone customers to a telephone call telephones are equipped with a calling device (a bell or other acoustic transducer) which is responsive to alternating current electric signals applied to the customers line at the telephone exchange. At the same time the calling customer receives tones indicating that the call has been switched through.

When the called customer answers the telephone it is necessary for the calling signal to be removed from that customers line, preferably near instantaneously, to avoid an intense sound being emitted from the telephone transducer. The calling tone indication must be removed from the calling customers line to indicate that the called customer has answered.

Removal of the calling signal and tone from the lines is known as 'Ring Trip' and ring trip detection is an inherently difficult function to perform. In some exchange installations ring trip detection is accomplished in software program of a computer control system and is limited accordingly by sampling rate that is the rate at which each line is considered by the computer to determine whether ring trip has occurred. Thus delay in detection of ring trip is possible.

In other exchange installations hardware on a per-line basis is provided which is a more costly solution. Such systems use analog detectors via analog filters for example.

It is an object of the present invention to provide a digital ring trip detector which is less susceptible to time delays resulting from sampling rate and which is less costly than the analog line equipment mentioned above.

SUMMARY OF THE INVENTION

Accordingly this and other objects of the invention are provided by a ring trip detector circuit comprising:

a terminal for connection to a customer line;

limiting means responsive to voltage on the customer line to produce a substantially square wave output reflecting presence or absence of direct current flow through the line;

duty cycle monitoring means which compares consecutive half-cycles of the square wave output;

and means to provide an output signal when consecutive half cycles of the square wave output are of substantially different durations.

In a specific embodiment of the invention the duty cycle monitoring means comprises a sampling circuit which which samples the square wave output at periodic intervals and which increments a counter for each sample of one polarity and which decrements the counter for each sample of another polarity, the counter providing a ring trip output signal when a predetermined count is reached.

BRIEF DESCRIPTION OF THE DRAWINGS

The invention will be readily understood by reference to the following description of a specific embodiment described by way of example only with reference to the accompanying drawings of which.

DETAILED DESCRIPTION OF THE SPECIFIC EMBODIMENT

Figure 1:
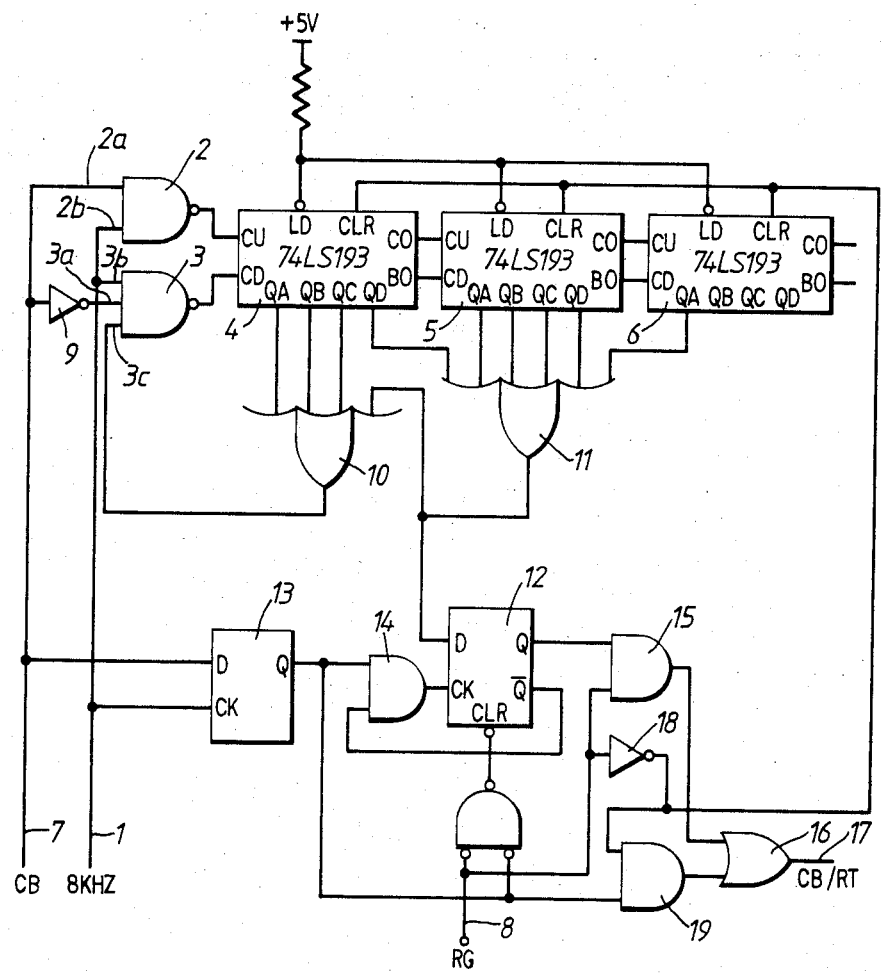
FIG. 1 is a block circuit diagram of a ring trip detection circuit in accordance with the invention.

Before proceeding with a detailed description of the ring trip detector circuit of FIG. 1 it is necessary for the method of operation to be discussed so that a full understanding of the circuit may be achieved.

Figure 2A:
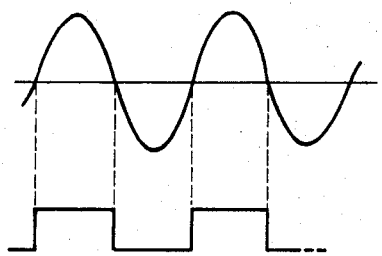
FIGS. 2A and B are waveform diagrams showing the effect of ring trip on the waveform of the ringing signal.

Thus referring to FIGS. 2A and B when ringing current is applied to a customer line with the customers telephone on hook little direct current flows through the line and the ringing cycle has a regular zero crossing arrangement as shown in the upper part of the Figure. When this signal is limited a square wave output having a substantially fifty-fifty duty cycle is obtained.

Figure 2B:
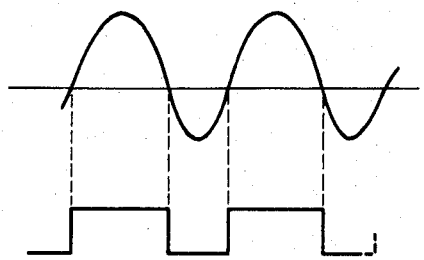

Now, when the customers telepone goes off-hook, that is the customer answers the call, direct current is induced in the customer line which changes the zero crossing pattern of the ringing cycle as shown in FIG. 2B thus causing a corresponding change in the duty cycle of the square wave output.

This change in duty cycle of the square wave output is what is used by the inventive ring trip detector by sampling the wave, incrementing a count for every sample that is positive and decrementing the count for every sample which is negative. However in the instant invention the count must be prevented from going below zero to ensure that any slight imbalance of the fifty/fifty duty cycle does not delay the detection of ring trip. The reason will become apparent later in the description.

Figure 3:
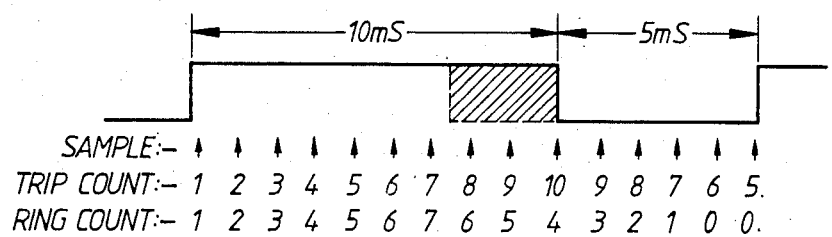
FIGS. 3, 4 and 5 are used to explain the operation of a sampling circuit within the circuit of FIG. 1; and, FIG. 6 is a flow diagram showing an algorithm implemented by the ring trip circuit of FIG. 1.

As is well known ring frequencies vary from exchange to exchange, in some cases the frequency being as low as fifteen Hertz and in other cases as high as, say, sixty five Hertz or more. Accordingly I have developed a frequency independent algorithm which the invention utilizes and this will now be considered as a mathematical model:

Referring to FIG. 3 and defining 'S' as the sample rate, 'P' as the period (which equals the period during which the signal is high (PH) plus the period during which the signal is low (PL)), and 'N' as the duty cycle delta $$\left( N = \frac{PH - PL}{P} \right) \text{ ; then in Figure 3 as shown}$$

$$P = 10\ mS + 5\ mS = 15\ mS$$

$$N = \frac{10 - 5}{15} = 0.333 \text{ and}$$

$$S = 1\ mS.$$

In the ringing period as indicated by the shaded area of FIG. 3, PH is equal to PL at 7.5. mS, thus N is zero. Now when the customer goes off hook the counter will be advanced by a number (K) in each ringing period and since $$K = \frac{NP}{S} \text{ then for FIG. 3,}$$

$$K = \frac{NP}{S} = \frac{(.333) \times 15 \text{ mS}}{1 \text{ mS}} = 5$$

So when the customer goes off-hook the counter will advance by five counts per ringing period. Note that sampling in the phase shown when the customer is on-hook gives a count of zero at the end of the ringing period. Now defining '1' as the detection period, or the length of time from customer going off-hook to the circuit detecting ring trip then D/P=number of periods per detection time Accordingly the count (C) resulting at the end of 'D' time is:

$$C = \frac{D}{P} \times K = \frac{D}{P} \times \frac{NP}{S} = \frac{ND}{S}$$

Solving this equation for D gives $$D = CS/N$$

Figure 4:
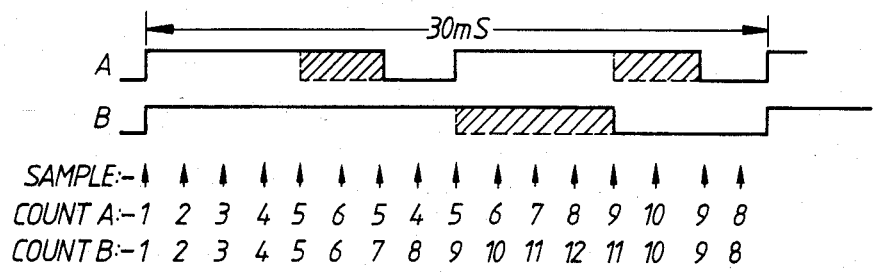

Thus the detection time is in dependant of the period P and is proportional to the sample rate (S) and the ring trip threshold C. The independancy is proved by considering FIG. 4 which shows at A a waveform for a ringing frequency of sixty six and two thirds Hertz and at B a ringing frequency of thirty three and one third Hertz.

Calculating N for waveform A gives:

$$N(a) = \frac{PH - PL}{P} = \frac{11.25 - 3.75}{15} = 0.5$$

and for waveform B $$N(b) = \frac{22.5 - 7.5}{30} = 0.5$$

Thus the count (C) at the end of D time should be the same for both waveforms. Taking D as thirty milliseconds and using sampling time of 1.875 mS $$C = NP/S = \frac{0.5 \times 30 \text{ mS}}{1.875 \text{ mS}} = 8$$

I have shown that in perfect conditions with phasing of the ring signals suiting the count then on a negative to positive transition of the square wave, a count of eight (with the parameters indicated) indicates ring trip.

However, in the real world of telecommunications the phasing of the signals is totally random. Consider the situation shown in FIG. 5 where all the parameters are the same as those of FIG. 4 but waveform B is not in ring trip.

Even though the average count of waveform B is zero, the phasing of the signals results in a count of eight on the positive to negative transition at the end of time D. Thus the situation exists where the maximum count (M), of a signal not at ring trip is greater than the ring trip threshold count (C).

Accordingly 'C' must be selected to give a threshold count that is always higher than the maximum count (M). But if we consider the worst case, that is a ringing frequency of fifteen Hertz we have a period of 66.66 mS and a half period of 33.33 mS.

Since $$M \text{ (for any ringing frequency)} = \frac{1}{2}\frac{P}{S}$$

then in the worst case $$M = \frac{33.33 \text{ mS}}{S}$$

Since C must be greater than M, in the worst case $$C \underline{\quad 33.3 \text{ mS} \quad}$$

Solving for S:

$$S \underline{\quad 33.3 \text{ mS} \quad}$$

Thus a maximum detection time (D) of a given N may be calculated:

$$D = \frac{CS}{N} = C\frac{(3.33)}{\frac{C}{N}} = \frac{33.3}{N}$$

So for N=0.05

$$D = \frac{33.3}{.05} = \underline{\quad 666 \text{ mS} \quad}$$

666 mS is considered to be an excessive detection time.

Figure 6:
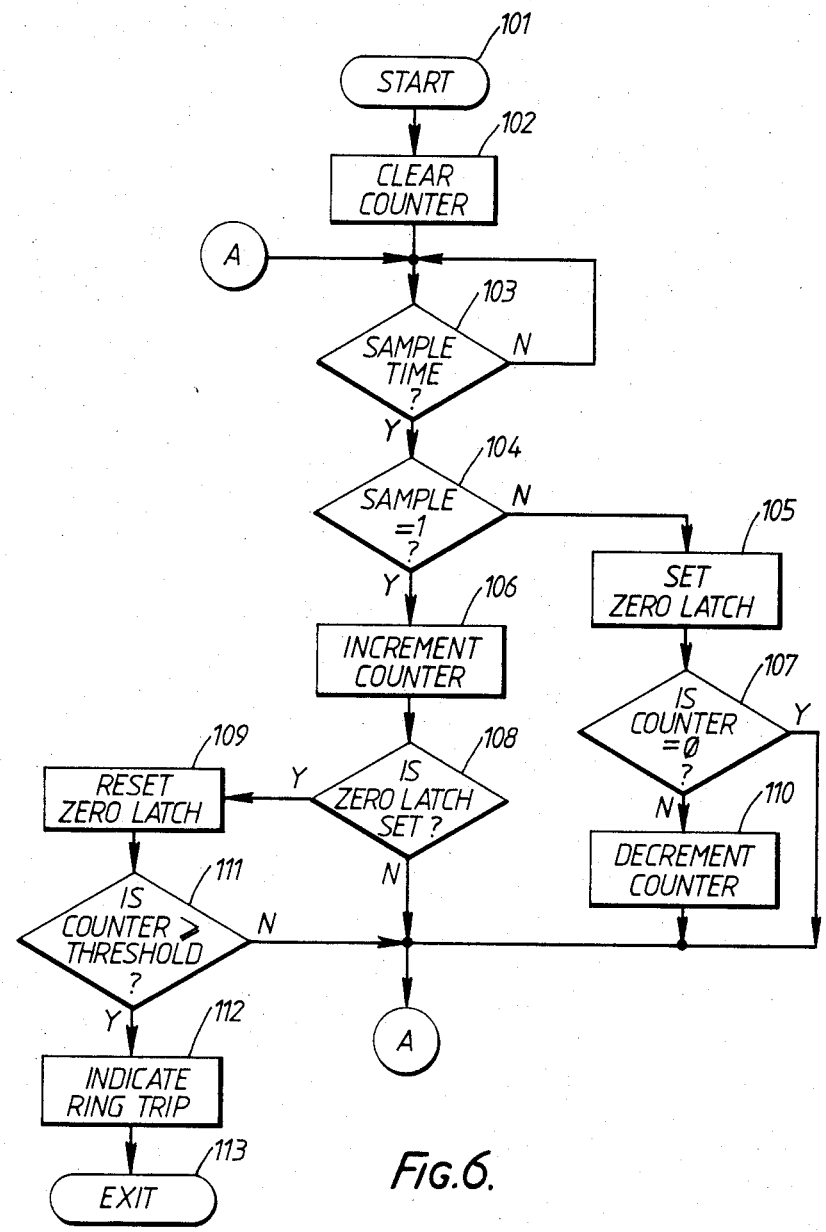

To reduce detection time, rather than checking the threshold count at time D, phase detection is employed such that the threshold count is checked only on low to high transitions of the sampled signal and at each such transition. FIG. 6 shows a flow diagram of the digital ring trip algorithm used in the invention and based on the facts outlined above.

Figure 5:
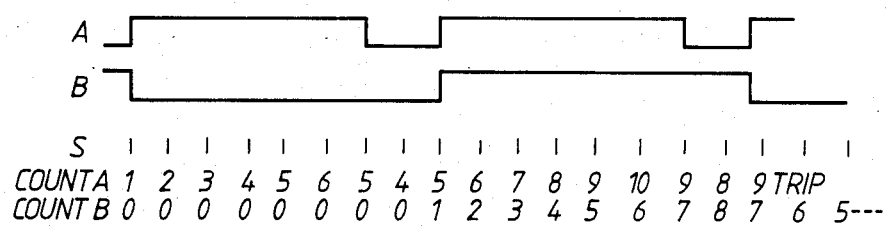

Referring to FIGS. 5 and 6 and considering first waveform B (which is not in ring trip) of FIG. 5 and applying the sampling to the algorithm of FIG. 6;

When ring trip is selected ("start") (101) the counter is cleared (102) and the algorithm awaits the first sample time (103). At the first sample time, the sample is interrogated to determine whether it is high or low (104) and since it is low the algorithm advances to set the zero latch (105), check whether the counter is at zero (107) and, since in this case the counter was cleared, returns to await the next sample (103). As will have been realised the counter check (107) prevents the counter going negative. After eight such cycles 103, 104, 105, 107 and 103, the square wave of FIG. 5 will have made a low to high transition.

Accordingly when the next sample time occurs (103) the sample (104) will be at value "1" causing a step to increment the counter (106). Since the zero latch was set at step 105, step 108 shows that a low to high transition has occurred and the algorithm causes the zero latch to be reset (109) and compares the counter value with the threshold (111). Since at this stage the counter will only contain a count of one the algorithm returns to await the next sample time (103). So long as the square wave of FIG. 5 remains high, the algorithm will cycle through steps 103, 104, 106 and 108 to 103 without further comparison of the the threshold value.

Now consider waveform A of FIG. 5 applied to the algorithm of FIG. 6 waveform A being in ring trip. Once the counter has been cleared 102, first ring cycle follows through steps 103, 104, 106, 108, 109 and 111 to 103 and thereafter through steps 103, 104, 106 and 108 to 103 for a further five cycles to give a count of six after ten milliseconds. On the next two samples 104 the counter will decrement through steps 105, 107 and 110 to 103. Now after fifteen milliseconds since the start of ring trip, the waveform A of FIG. 5 goes high again leading to another cycle of steps 103, 104, 106, 108, 109 and 111.

At step 111 assuming that the threshold value is set to eight and the counter previously reached six, (been decremented twice and incremented once), the cycle returns to 103 through 104, 106, 108 to 103. It will be noted that although after approximately twenty milliseconds the count exceeds the threshold value, due to the phase check, no action is taken by the algorithm and neither is action taken by the algorithm on the high to low transition at twenty five milliseconds on the high to low transition of waveform A when the count is well above the threshold value. This overcomes the worst case phasing problem outlined above since, if ring trip were to be indicated on the high to low transistion, waveform B of FIG. 5 would have caused ring trip to be indicated on its high to low transistion with the threshold set at eight.

Returning now to waveform A of FIG. 5, the next two cycles though the algorithm 103, 104, 105, 107, 110 to 103 cause two decrements of the count (giving a value of eight) and on the next cycle at thirty milliseconds with a low to high transition (as indicated by the zero latch being set at step 108), the count will be nine. Therefore at step 111 the count will exceed the threshold and the algorithm indicates ring trip at step 112.

The algorithm is implemented in hardware using very large scale integrated (VLSI) circuit technology although it will be appreciated that discrete components or circuit board arrangement or integrated circuit could be used.

Using VLSI technology one twenty eight pin integrated circuit package can service up to eight lines independently at a very low per line cost.

Reference will now be made to FIG. 1 which shows the interconnection of counters and logic gates within the IC package and the hardware implementation of the algorithm of FIG. 6 will be discussed.

To ensure detection of ring trip in any ringing frequency between fifteen Hertz and sixty six and two thirds Hertz, the maximum sample rate must be selected so that a one percent deviation in the shortest period may be detected. The shortest period is at the highest frequency and is fifteen milliseconds.

Accordingly

'S' maximum = 1% of 15 milliseconds

= 150 microseconds 150 microseconds corresponds to a frequency of 666.6. Hertz which is a difficult frequency to obtain. Accordingly a frequency of eight kilo Hertz is used giving a sample time of 125 microseconds which is acceptable as it is less than S max.

The eight kilohertz sampling signal is applied by way of an input 1 to one input of each of two NAND gates 2 and 3. The eight kilohertz signal causes a nine-bit counter made up of three four-bit counters 4, 5, and 6 (only one bit of counter 6 being used) to count up or down dependant on the signal present on another circuit input 7 which carries the line CB signal when the line is ringing. Line ringing is also indicated by an RG signal on a further circuit input 8.

Considering first the action of the coutner 4, 5, 6 and the NAND gates 2 and 3. When the CB signal is high, a 'one' signal is present on input 2a of the NAND gate 2. Inversion of the CB signal by an inverter 9 causes a 'zero' signal to be present on input 3a of the NAND gate 3 thus effectively disabling the count down signal to the CD input of the counter 4. Now with input 2a high when the eight kilohertz signal on the input 1 goes high a count pulse is enabled through the gate 2 to the CV input of the counter 4 causing it to count up at the eight kilohertz rate. The count overflow (after sixteen pulses) signal from the counter 4 CO output causes count up signal to the CV input of the counter 5 and similar cascading of count overflow from the counter 5 to the counter 6 also occurs when an appropriate count is reached.

Similarly when the CB signal is low, a zero signal is present on input 2a while a 'one signal' is present on input 3a and, ignoring temporarily the effect of input 3C of the NAND gate 3 it will be realised that the counter 4, 5, 6 counts down at the eight kilohertz rate. Thus, so long as the line is not in ring trip the counter will regularly count up to a value dependent on ring trip frequency and then back down to zero.

However, as has been mentioned previously, the counter 4, 5, 6 must not be allowed to go negative and this is achieved by use of two OR gates 10 and 11 although this is not their sole function. Accordingly if there is a count 'one' signal present at any output of any of the counters 4, 5, 6 a 'one' signal will be present on the input 3c of NAND gate 3. Once all of the outputs are at 'zero', that is when the nine-bit counter contains a count of zero then neither OR gate 11 or OR gate 10 have a 'one' output signal, input 3c is zero and the eight kilohertz signal is prevented from pulsing the 'CD' input of the counter 4 thereby inhibiting countdown of the nine-bit counter below zero.

The second function of OR gate 11 is to indicate the possiblity that ring trip has occurred. Thus if at any time the count held by the counter 4, 5, 6 exceed '1000' (binary) then a 'one' output signal from the OR gate 11 is fed to the 'set' input of a D flip-flop 12. The flip-flop 12 is not set by the presence of this one signal unless the CB signal on the input 7 changes from negative to positive going thus meeting the other requirement of the alogrithm set out above.

To achieve this the CB signal is synchronized by the eight kilohertz singal by clocking another D flip-flop 13. Thus when the CB signal goes high, the Q output of flip-flop 13 also goes high for one-pulse only of the eight kilohertz signal. The signal from the Q output of flip-flop 3 is fed by way of AND gate 14 which is enabled by the Q signal of flip-flop 12. To clock the flip-flop 12 which, if '1000' is exceeded in the counter 4, 5, 6 will change to provide an output signal on its Q output. Bar Q of the flip-flop 12 is fed back to the other input of the AND gate 14 to disable any further clocking of that flip-flop thus locking the output signal. The output signal from the flip-flop 12 now passes by way of an AND gate 15 which is enabled by the RG signal on its other input to a two to one multiplexer in the form of OR gate 16 to provide an output signal indicating ring trip on an output lead 17.

It is noted that in the silent period of the ringing cycle the RG signal is inverted by an inverter 18 and is passed to the 'clear' input of all the counters 4, 5, and 6 to ensure that the counters are reset to zero for the start of each ringing period of the ringing cycle.

The one signal from inverter 18 is also applied as all enable signal to an AND gate 19 which is used for detecting ring trip if it occurs in the silent period. Thus, if the ring trip occurs in the silent period, the signal on input 7 goes high causing the flip-flop 13 to set providing a one output to the other input of the AND gate 19. The one signal from AND gate 19 passes through the multiplexer OR gate 16 to provide ring trip indication at lead 17.

It will be realized that for the duration of a call, the signal on the input 7 remains high maintaining a ring trip indication on the output lead 17. On call release, the signal on the input lead 7 goes low causing by way of flip-flop 13 AND gate 19 and OR gate 16 a change in the signal on the output 17 to indicate subscriber on-hook.

Although I have not described the power supply used by the circuit of FIG. 1, since power supply technology is already well known, I have indicated in FIG. 1 the presence of a five volt positive direct current supply. It should be noted that this five volt value is not fixed, and, in practice, satisfactory operation of the circuit may be achieved using a power source in the range of +3 to +5 volts.

Also, my circuit has been implemented using other technologies and when CMOS techniques are employed, the power supply could be between +3 and +15 volts.

As should now be clear, my invention provides an effective ring trip detection circuit which is readily implemented using discrete logic devices, thereby permitting effective ring trip detection circuitry to be implemented using very large scale integration techniques operating in the manner outlined above.

It should be realized that when I refer to a terminal connected to a customer line, I mean this to include the use of limiting means serving to create the square wave required for the CB input of the Ring Trip Detection Circuit. By way of example, the limiting means may include the use of a hybrid to balance the line, accomplish a 2 wire to 4 wire conversion, and provide a digitized CB signal output to the circuit of my invention.

What is claimed is:

1. A ring trip detection circuit comprising:
a terminal for connection to a customer line;
limiting means to limit ringing signal voltage on the customer line to produce a substantially square wave output;
duty cycle monitoring means which compares consecutive opposite polarity cycles of the square wave output;
and means to provide an output signal when consecutive opposite polarity cycles of the square wave output are of substantially different durations,
said duty cycle monitoring means comprises a sampling circuit which samples the square wave output at periodic intervals and which increments a counter for each sample of one polarity and which decrements the counter for each sample of another polarity, the counter providing a ring trip output signal when a predetermined count is reached; and,
inhibit means is provided which prevents the counter from decrementing when the count therein is zero.

2. A ring trip detection circuit comprising:
a terminal for connection to a customer line;
a terminal for connection to a sampling frequency signal;
a pair of logic gates each connected to said terminals;
a counter having an up count input and a down count input;
said up count input being connected to one of said pair of logic gates, said down count input being connected to the other of said pair of logic gates;
said one of said logic gates providing an output signal at the sampling frequency when ringing is present on the customer line and said other of said logic gates providing an output signal at the sampling frequency when no ringing is present on the customer line;
a further logic gate connected to outputs of the counter and providing a signal when a predetermined count value of the counter is exceeded; and,
a flip-flop which is clocked when the signal on the customer line changes from ringing to no ringing, a control input of said flip-flop being connected to the output of said further logic gate, said flip-flop switching to provide an output signal when said predetermined value in the counter is exceeded,
said ring trip detection circuit further comprising a further logic gate which provides an output signal when the value of the count in the counter is zero, said output being connected to one input of said other of said pair of logic gates to inhibit further countdown of the counter.

3. An integrated circuit device including at least one ring trip detection circuit comprising:
a terminal for connection to a sampling frequency signal;
a pair of logic gates each connected to said terminals;
a counter having an up count input and a down count input;
said up count input being connected to one of said pair of logic gates, said down count input being connected to the other of said pair of logic gates;
said one of said logic gates providing an output signal at the sampling frequency when ringing is present on the customer line and said other of said logic gates providing an output signal at the sampling frequency when no ringing is present on the customer line;
a further logic gate connected to outputs of the counter and providing a signal when a predetermined count value of the counter is exceeded;
and a flip-flop which is clocked when the signal on the customer line changes from ringing to no ringing, a control input of said flip-flop being connected to the output of said further logic gate, said flip-flop switching to provide an output signal when said predetermined value in the counter is exceeded,
said ring trip detection circuit further comprising a further logic gate which provides an output signal when the value of the count in the counter is zero, said output being connected to one input of said other of said pair of logic gates to inhibit further countdown of the counter.

* * * * *